United States Patent [19]

Yabe

[11] Patent Number: 4,581,952
[45] Date of Patent: Apr. 15, 1986

[54] STEERING APPARATUS OF RACK AND PINION TYPE

[75] Inventor: Chiaki Yabe, Kawashima, Japan

[73] Assignee: Jidosha Kiki Co., Ltd., Tokyo, Japan

[21] Appl. No.: 605,726

[22] Filed: May 1, 1984

[30] Foreign Application Priority Data

May 6, 1983 [JP] Japan .................. 58-79649

[51] Int. Cl.[4] .................. F16H 1/04; B62D 1/20
[52] U.S. Cl. .................. 74/498; 74/422
[58] Field of Search .................. 74/422, 498

[56] References Cited

U.S. PATENT DOCUMENTS

| 3,572,158 | 3/1971 | Adams | 74/498 |
| 4,116,085 | 9/1978 | Bishop | 74/498 |
| 4,215,591 | 8/1980 | Bishop | 74/498 |
| 4,296,641 | 10/1981 | May | 74/498 |
| 4,448,088 | 5/1984 | Adams | 74/422 |

FOREIGN PATENT DOCUMENTS

| 498922 | 5/1972 | Japan . | |
| 4961828 | 5/1973 | Japan . | |
| 51-91535 | 2/1975 | Japan . | |
| 2096729 | 10/1982 | United Kingdom | 74/498 |

Primary Examiner—Lawrence J. Staab
Assistant Examiner—Michael D. Bednarek
Attorney, Agent, or Firm—Flynn, Thiel, Boutell & Tanis

[57] ABSTRACT

A steering apparatus of rack and pinion type includes a rack, the back surface of which is configured to change continuously in the axial direction thereof. A support member slidably carries the back surface of the rack and is configured as a curve, as viewed in a plane perpendicular to the axis of rack, whereby the point of contact between the rack and the support member moves over the contacting surface of the support member as the rack reciprocates.

12 Claims, 8 Drawing Figures

STEERING APPARATUS OF RACK AND PINION TYPE

BACKGROUND OF THE INVENTION

The invention relates to a steering apparatus of rack and pinion type.

A typical steering apparatus of rack and pinion type is illustrated in FIG. 1 wherein a steering body 1 includes a bearing which rotatably supports a pinion 2, which is mechanically interlocked with a steering wheel, not shown, and which meshes with a rack 3 which reciprocates axially as the pinion rotates. The apparatus also includes a support member 4 which is disposed in abutting relationship with the backside of the rack 3 to support it in a slidable manner. The support member is biased by a spring 5 to urge the rack 3 against the pinion 2. In a conventional arrangement as described, there is no change in the condition of contact between the rack 3 and the support member 4 during a stroking of the rack which occurs in response to the rotation of the pinion 2 as the steering wheel is operated. In other words, points of contact $P_1$ and $P_2$ between the rack 3 and the support member 4 remain at identical positions in a plane perpendicular to the axis of the rack 3, without experiencing any movement. Consequently, a sliding resistance between the rack 3 and the support member 4 remains constant and does not change over the full stroke of the rack 3.

Referring to FIG. 2 for considering a sliding resistance between the rack 3 and the support member 4 it will be seen that when the rack 3 and the support member 4 contact each other at two points, the reaction force of the spring F will be divided into vertical components of F/2 at each of the points of contact $P_1$ and $P_2$. Representing the angle formed between a line which is orthogonal to the component F/2 and the tangent to each of the points of contact $P_1$ and $P_2$ by $\theta$, the drag f of the support member 4 which results from the reaction force F of the spring at these points will be given as follows:

$$f = F/2/\cos\theta$$

The sliding resistance R between the rack 3 and the support member 4 is given by the following equation:

$$R = f\mu$$

where $\mu$ represents a coefficient of friction.

When the sliding resistance has a constant magnitude as in conventional arrangements, the reaction force to the steering wheel will exhibit a linear response when viewed as a steering apparatus singly. It is generally recognized that an increase or a decrease in the magnitude of the reaction force applied to the steering wheel has an effective contribution to a recognition of the steering effort by a driver when considering the steering sensation which a driver experiences in a typical vehicle. However, when the sliding resistance has a constant magnitude, it is difficult to produce an optimum steering sensation by creating a delicate change in the reaction force applied to the steering wheel.

SUMMARY OF THE INVENTION

It is therefore an object of the invention to provide a steering apparatus of rack and pinion type which increases or decreases the magnitude of a reaction force applied to a steering wheel in accordance with the stroke of a rack, thereby obtaining a desirable steering sensation or feeling.

The reaction force applied to the steering wheel can be increased or decreased by a corresponding increase or decrease in the sliding resistance between the rack and the support member in accordance with the stroke of the rack. At this end, the direction of the drag f from the support member 4 at the points of contact $P_1$ and $P_2$ may be changed, as will be appreciated from the equation given above. Accordingly, the profile or the cross-sectional configuration of the rack taken through a plane perpendicular to the axis thereof is continuously changed along the length of the rack, and the support member has a surface which contacts the rack and which is configured to be a curve when viewed in a plane perpendicular to the axis of the rack. In this manner, the points of contact between the rack and the support member are allowed to move over the contacting surface of the support member as the rack reciprocates, thereby changing the direction of the normal at the point of contact or the direction of the drag.

DESCRIPTION OF EMBODIMENTS

Figure 3:
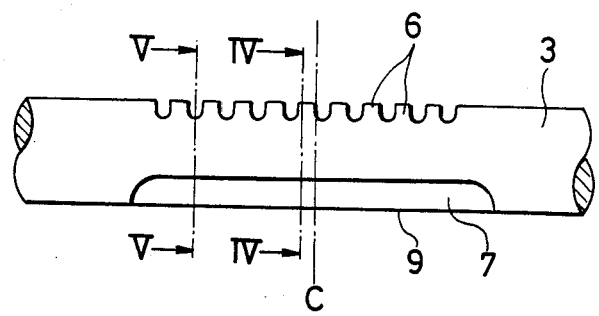
FIG. 3 is a front view of a rack according to one embodiment of the invention.
Figure 4:
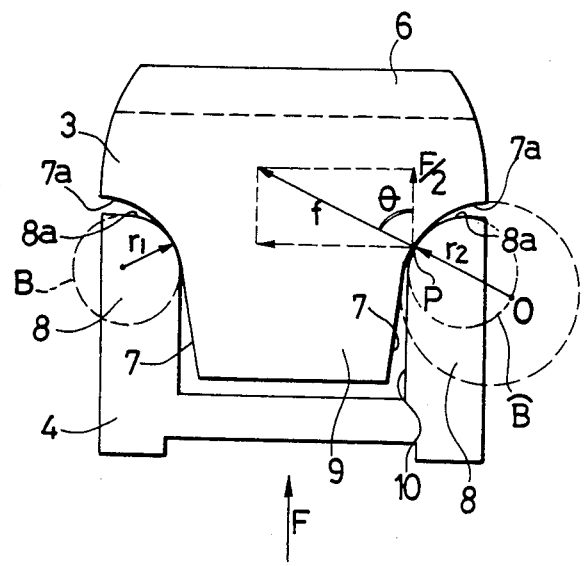
FIGS. 4 and 5 are cross sections of the rack located on the support member, as taken through lines IV—IV and V—V shown in FIG. 3.
Figure 5:
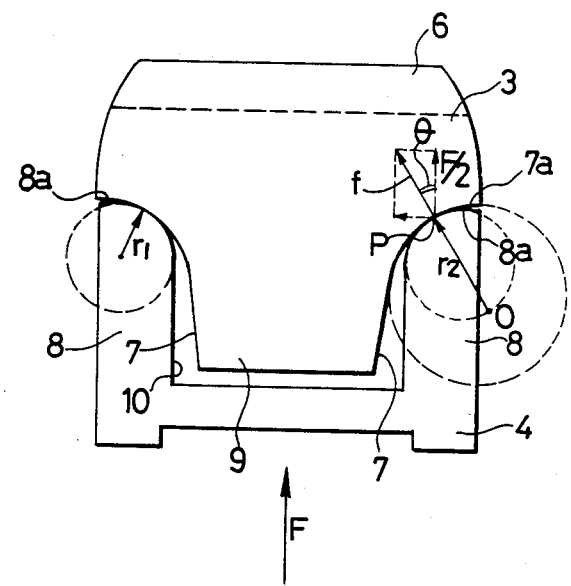

Referring to FIGS. 3 to 5, the rack 3 includes a region where teeth 6 are formed. On the backside, the lateral sides of the rack 3 which are located on the opposite sides of the teeth region are cut out to present a substantially T-shaped cross section when viewed in a plane perpendicular to the axis thereof. A support member 4 which is used to urge the rack 3 against a pinion, not shown, under the resilience of a spring, also not shown, includes a pair of abutments 8 which mate with both cut-outs 7 of the rack 3 by a sliding contact, and a recess 10 which receives an axially extending projection 9 which extends downwardly between the both cut-outs 7 and corresponding to the vertical stem of the T-configuration. Each of the abutments 8 has a convex arcuate upper surface 8a having a radius of curvature $r_1$ and which mates with the respective lateral slide of the rack 3. Each cut-out 7 has a concave arcuate surface 7a having a radius of curvature $r_2$ greater than the radius of curvature $r_1$ for engagement with the arcuate surface 8a on the support member 4. The center O of the circle which partly defines the concave arcuate surface 7a is located in a manner such that it moves along an arc of circle B, shown in broken lines on the left-hand side of FIG. 4, which defines the arcuate surface 8a, as the rack 3 moves axially or longitudinally, as will be noted by a comparison of FIGS. 4 and 5. Specifically, when the rack 3 engages the support member in a region adjacent to its center C, the point of contact P between the rack 3 and the support member 4 will be located in a relatively lower region on the arcuate surface 8a (see FIG. 4) while for an end region of the rack 3, the point of contact P will be located in an upper portion on the arcuate surface 8a (see FIG. 5). For intermediate positions of the rack, the point of contact P progressively moves along the arcuate surface 8a.

Considering the sliding resistance R for the center region and the end region of the rack 3 as shown in FIGS. 4 and 5, respectively, for purpose of comparison, the equation $R = f\mu$ indicates that the sliding resistance R depends on the magnitude of the drag f created at the point of contact P by the support member 4 as a result of the reaction force F of the spring. If the reaction force F remains constant, it will be seen that the drag f will increase as the point of contact P moves downwardly since then the angle $\theta$ then increases, with consequence that the sliding resistance R will increase toward the center of the rack. For an intermediate region between the center region and the end region of the rack 3, the magnitude of the drag f or the inclination of the normal at the point of contact P changes gradually since such point continuously moves over the arcuate surface 8a, thus causing a continuous decrease in the magnitude of the sliding resistance R. By increasing or decreasing the sliding resistance between the rack 3 and the support member 4 over the stroke of the rack 3, it is possible to change the reaction force applied to the steering wheel in a desired range, thus improving a steering sensation. A shift in the point of contact with the support member 4 permits a local abrasion of the support member 4 to be prevented. Also, a "shimmy" effect can be mitigated by increasing the sliding resistance toward the neutral position of the steering wheel.

In the described embodiment, an arrangement is made to increase the sliding resistance toward the center region C and to reduce it toward the opposite end regions of the rack 3, with the sliding resistance being gradually decreased intermediate the both regions. However, conversely, it is also possible to rreduce the sliding resistance toward the center region and to increase it toward the end region or alternatively to achieve any desired increase or decrease in the sliding resistance over the entire range, thus accomplishing a desired steering feeling.

Figure 6:
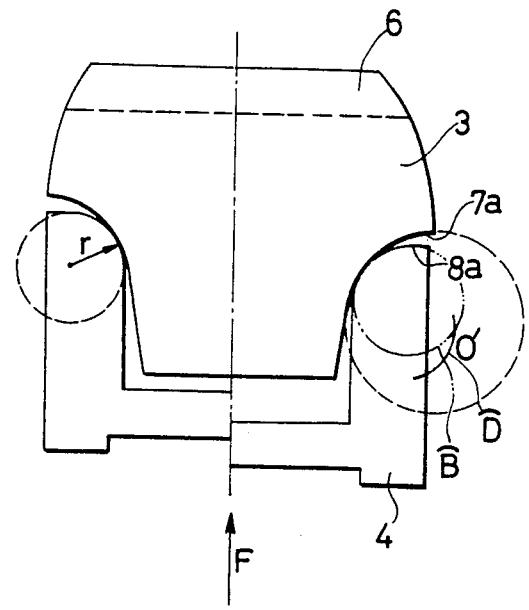
FIG. 6 is a similar cross section of another embodiment of the invention, it being understood that the left- and right-hand portions of this Figure illustrate different portions of the rack.

By moving the center O′ of the circle which defines the concave surface 7a of the rack 3 downward in a gradual manner with respect to B, as indicated by a line D shown in FIG. 6, the concave surface 7a on the rack 3 will progressively move away from the teeth 6 of the rack, whereby the point of contact P between the rack 3 and the support member 4 will not only move along the arcuate surface 8a on the support member 4, but also serves forcing the latter downward. This increases the reaction force F, allowing an increased increase or decrease in the sliding resistance R.

Figure 1:
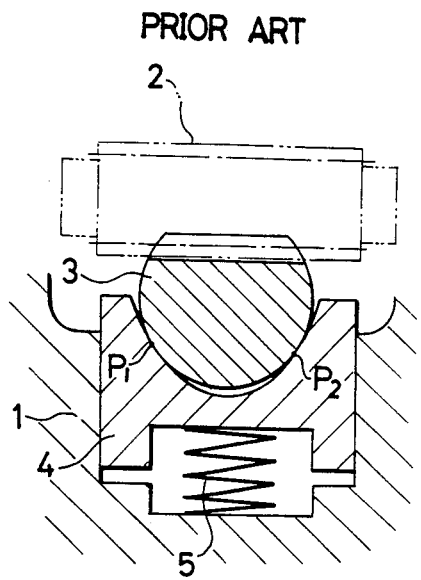
FIG. 1 is a schematic view, partly in section, of a conventional steering apparatus of rack and pinion type.
Figure 2:
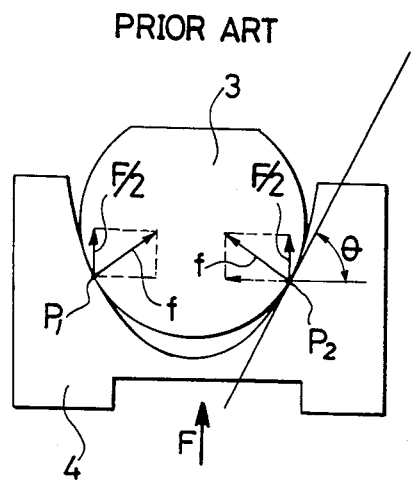
FIG. 2 is a diagram illustrating a sliding resistance between the rack and the support member.
Figure 8:
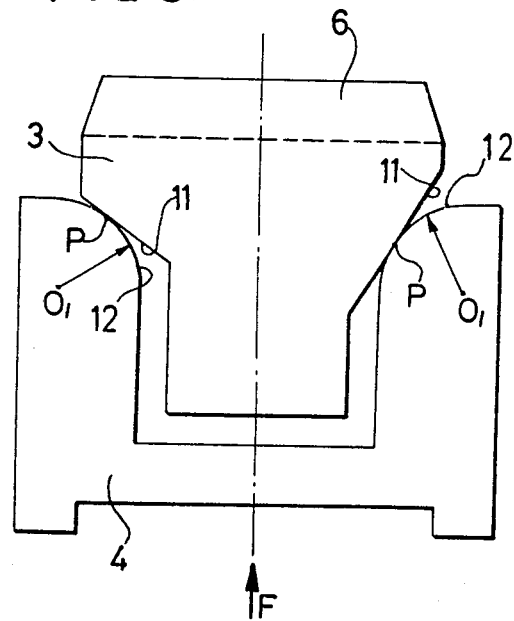
FIG. 8 is a schematic view of yet another embodiment of the invention, with the left- and right-hand portions being taken from planes which are axially displaced on the rack.
Figure 7:
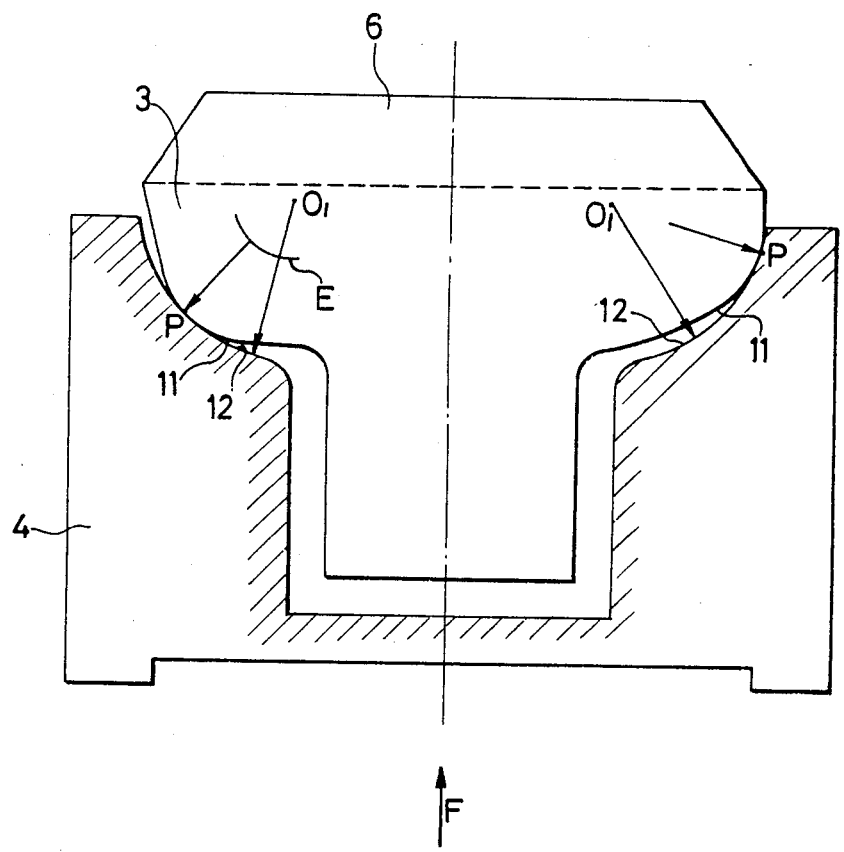
FIG. 7 is a similar cross section of a further embodiment of the invention, with the left- and right-hand portions being taken from different positions along the length of the rack.

It is to be understood that the contacting surface on the rack and the support member need not be arcuate as illustrated in the embodiment mentioned above in order to cause an increase or a decrease in the sliding resistance by changing the point of contact between the rack and the support member. By way of example, it is also possible to have a varying cross section of the rack, as viewed in a plane perpendicular to the axis thereof, to thereby achieve a continuous change in the point of contact, by choosing a contacting surface of the rack which is a concave surface other than part of a circle or a flat surface, in combination with any convex surface other than part of a circle for the support member. Alternatively, the rack may have a convex arcuate or other curved cross section, as viewed in a plane perpendicular to the axis thereof. As a further alternative, FIG. 7 shows a support member 4 having a contacting surface 10 which is concave, including a surface defined by part of a circle, while a rack 3 may be defined as a convex curved surface which may or may not be part of a circle 11. It is to be noted that the left-hand portion of FIG. 7 shows the manner of contact for the center region of the rack 3 while the right-hand portion shows the manner of contact for the end region of the rack 3. (The reverse may be true if desired.) In this Figure, $O_1$ represents the center of a circle which defines the arcuate surface on the support member 4, E the locus depicted by the center of the arcuate surface in the contacting region of the rack 3, and P the point of contact. Also, FIG. 8 shows a support member 4 having a contacting surface 12 which is defined by a convex curved surface. By contrast, a rack 3 has a flat contacting surface 11. As before, the left- and right-hand portions of FIG. 8 illustrate the manner of contact for different regions of the rack. Instead of choosing a substantially T-shaped cross section for the rack, when viewed in a plane perpendicular to the axis thereof, the rack may comprise a round rod as used in the prior art and illustrated in FIGS. 1 and 2, with the cross-sectional configuration being varied to achieve a similar effect as the point of contact moves over the curved surface on the support member.

While the invention has been shown and described above in connection with several embodiments thereof, it should be apparent that a number of changes, modifications and substitutions will readily occur to one skilled in the art without departing from the scope and spirit of the invention defined by the appended claims.

What is claimed:

1. A steering apparatus of the rack and pinion type, including: a pinion disposed for rotation in interlocked relationship with a steering wheel, an elongated rack meshed with said pinion for reciprocal movement in the direction of the longitudinal axis of said rack as the pinion rotates, a support member slidably carrying said rack on two zones of contact on first contact surfaces of said support member, which contact surfaces are of a curved shape when viewed in an imaginary cutting plane perpendicular to the longitudinal axis of said rack, said contact surfaces being shaped to maintain the longitudinal axis of said rack a constant, predetermined distance from said support member as said rack is moved longitudinally with respect to said support member, said rack having second contact surfaces specially adapted for being carried by said first contact surfaces of said support member so that as said rack is reciprocally moved along said support member said zones of contact move continuously in the vertical direction perpendicular to said longitudinal axis of said rack, wherein said second contact surfaces are configured so that the shape of the cross-section of said rack continuously changes along the longitudinal axis of said rack.

2. A steering apparatus of rack and pinion type according to claim 1, further characterized in that the rack and the support member movably engage each other at two points of contact, as viewed from a plane perpendicular to the axis of the rack and said zones of contact on said rack are disposed on opposite lateral sides of the longitudinal axis of said rack.

3. A steering apparatus of rack and pinion type according to claim 2, further characterized in that the contacting surface of the support member is a convex curve, as viewed from a plane perpendicular to the axis of the rack.

4. A steering apparatus of rack and pinion type according to claim 3, further characterized in that the contacting surface of the support member is a convex, arcuate surface, as viewed from a plane perpendicular to the axis of the rack.

5. A steering apparatus of rack and pinion type according to claim 3, further characterized in that a portion of the rack which engages the support member is configured as a concave curve, as viewed from a plane perpendicular to the axis thereof.

6. A steering apparatus of rack and pinion type according to claim 4, further characterized in that a portion of the rack which engages with the support member is configured as a concave arcuate form having a radius of curvature greater than the radius of curvature of the convex arcuate surface formed on the support member.

7. A steering apparatus of rack and pinion type according to claim 3, further characterized in that a portion of the rack which engages the support member is configured as a rectilinear form as viewed from a plane perpendicular to the axis thereof.

8. A steering apparatus of rack and pinion type according to claim 2, further characterized in that the contacting surface of the support member is defined as a concave curve, as viewed from a plane perpendicular to the axis of the rack.

9. A steering apparatus of rack and pinion type according to claim 8, further characterized in that the contacting surface of the support member is configured as a concave arcuate form, as viewed from a plane perpendicular to the axis of the rack.

10. A steering apparatus of rack and pinion type according to claim 8, further characterized in that a portion of the rack which engages the support member is defined as a convex curve, as viewed from a plane perpendicular to the axis thereof.

11. A steering apparatus of rack and pinion type according to claim 10, further characterized in that a portion of the rack which engages the support member is configured as a convex arcuate form, as viewed from a plane perpendicular to the axis thereof.

12. In a steering apparatus of the rack and pinion type comprising:
a housing;
a pinion rotatably mounted in said housing and adapted to be rotated by a steering wheel;
an elongated rack mounted for reciprocable, longitudinal sliding movement in said housing, said rack having a longitudinally extending row of rack teeth on the side thereof that is adjacent to said pinion, said rack teeth being meshed with said pinion so that said rack is adapted to be moved longitudinally in response to rotation of said pinion;
an elongated support member mounted in said housing and slidably engaging the side of said rack which is remote from said pinion so that said rack is supported for longitudinal sliding movement in said housing;
a spring urging said support member against said rack whereby to urge said rack teeth into meshed engagement with said pinion, the improvement which comprises:
said support member and said rack each have two elongated contact surfaces extending lengthwise thereof and respectively located on opposite lateral sides of the longitudinal axis of said rack, the contact surfaces of said rack being in sliding engagement with the corresponding contact surfaces of said support member at lengthwise extending zones of contact therebetween, said two contact surfaces of said support member having corresponding curved shapes when viewed in cross-section which curved shapes are uniform along the length of said support member, said contact surfaces of said rack having corresponding cross-sectional shapes which continuously change along the lengthwise extent of said rack so that the points of contact that lie in any given imaginary cutting plane perpendicular to the longitudinal axis of said rack move vertically on said support member as said rack is slid longitudinally along said support member, without changing the distance between the longitudinal axis of said rack and said support member, whereby to vary the sliding resistance between said rack and said support member in response to longitudinal movement of said rack and thereby impose on the steering wheel a variable reaction force in opposition to the steering effort.

* * * * *